April 9, 1929.  G. D. BRADSHAW  1,708,651
FLUID SEPARATOR
Filed Oct. 11, 1923  2 Sheets-Sheet 1

INVENTOR:
Grant D. Bradshaw
By E. J. Andrews
Atty.

April 9, 1929.  G. D. BRADSHAW  1,708,651
FLUID SEPARATOR
Filed Oct. 11, 1923  2 Sheets-Sheet 2
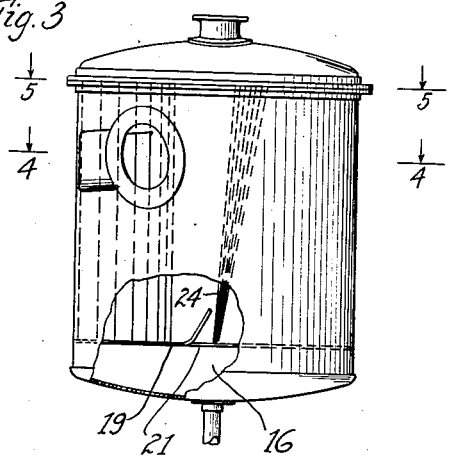
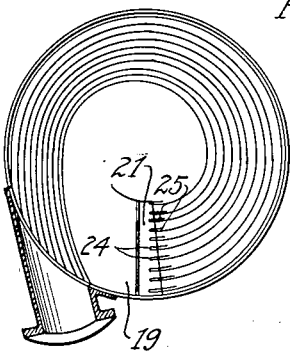
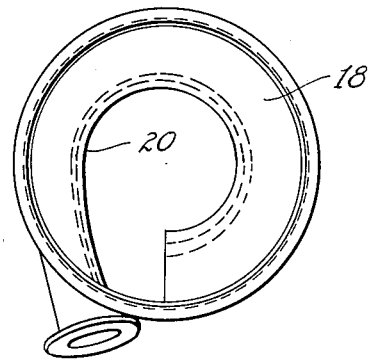
INVENTOR:
Grant D. Bradshaw
By E J Andrews
Att'y.

Patented Apr. 9, 1929.

1,708,651

UNITED STATES PATENT OFFICE.

GRANT D. BRADSHAW, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY.

FLUID SEPARATOR.

Application filed October 11, 1923. Serial No. 667,819.

This invention relates to improvements in fluid separators for purifying or drying gases by separating from the gases any vapor that may be mixed therewith; and the invention relates particularly to separators to be used in steam power plants for separating the moisture from the steam which is being used, or in oil refining plants for the separation of liquid phase particles from their gases. One object of the invention is to provide a method for separating vapor from gases, such as moisture from steam, and to provide suitable apparatus which will very thoroughly separate the moisture from the steam and which may be conveniently inserted in the main steam line of the boiler. Other objects of the invention will be apparent from a consideration of the accompanying drawings and the following description thereof.

Figure 1:
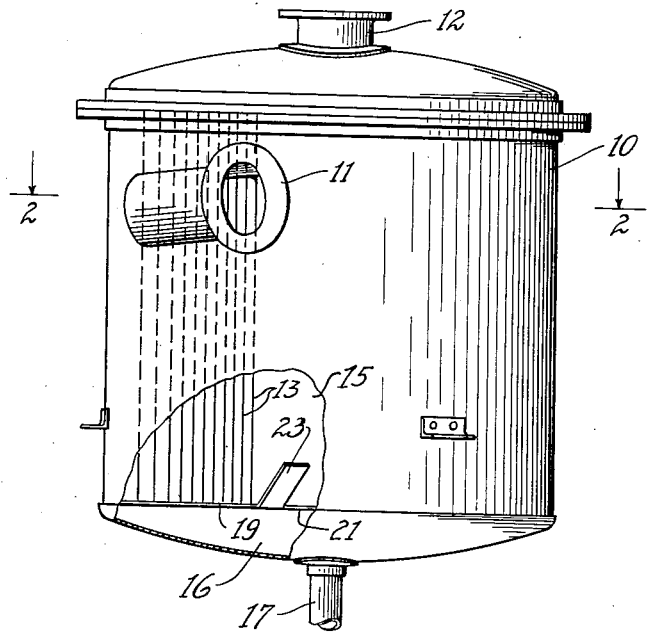
Figure 2:
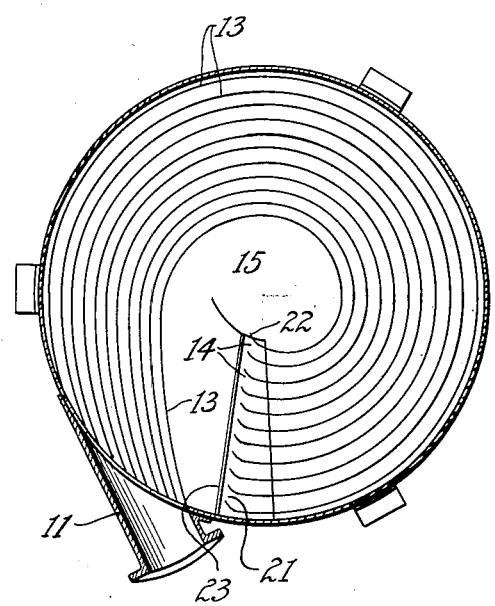

Of the drawings Fig. 1 is an elevation of a steam separator which embodies the features of my invention, with a portion broken away to show the interior; Fig. 2 is a transverse central view along the line 2—2 of Fig. 1; Fig. 3 is an elevation, somewhat reduced, of a modification of the steam separator of Figs. 1 and 2; and Figs. 4 and 5 are sectional views along the respective lines 4—4, 5—5, of Fig. 3.

Although the method which I have invented may be applied to various other purposes, yet for the purpose of illustration in this instance I will describe it as applied to the separation of water vapor from steam. As is well understood the separation of moisture and other impurities from steam results when the steam is thrown against baffles, as the moisture adheres to the surfaces of the baffles and runs downwardly and can be drained away, while the steam flows away form the baffle surfaces and passes on to the outlet and into the steam mains. In order to completely separate the moisture from the steam in this manner the steam must be repeatedly forced against the baffles as the moisture is carried away merely by the force of gravity as drops of sufficient size are formed. I take advantage not only of the adhesion of the moisture to the surface of the baffles and the formation of drops by the surface tension of the liquid; but I also force the moisture against the surfaces in such a direction as to assist gravity in carrying the moisture out of the range of the steam and so as not to materially interfere with the flow of the steam. In general the principles involved is to form the steam into thin sheets and to bring these sheets at a very acute angle against the surface of the baffles so that the liquid comes sharply in contact therewith but so that the momentum of the steam is not seriously interfered with, while in the more common baffle systems in use the direction of flow of the steam is entirely overcome, and often many times before the baffles are passed. At the same time the direction of flow of the steam and particularly of the moisture as it is forced by the steam along the surfaces of the baffles is such as to assist gravity in separating the two fluids. In carrying out my method I provide a suitable casing 10 for enclosing the separating mechanism, the casing having a steam inlet 11, which is connected in any suitable manner to the steam outlet from the boiler, and a steam outlet 12, which is connected in any suitable manner to the steam supply main, the impure steam passing in at the inlet 11 and the purified steam passing out of the outlet 12. Within the casing are mounted a series of baffles so arranged that the steam mass is formed into thin sheets and the flow thereof gradually changed in direction; and this effect is continued until the steam is sufficiently purified by the moisture adhering to the baffle surfaces, forming drops and passing downwardly out of the path of the steam.

In practice, I prefer to use for this purpose a series of circularly or spirally shaped baffles 13 which extend vertically substantially from the top to the bottom of the interior of the casing 10, forming vertical circular or spiral-shaped channels in the casing, with one end of the channels located adjacent the inlet 11 and the other end also adjacent the inlet, but being separated therefrom by the inner baffle 13. By this arrangement the steam passing in at the inlet 11 is immediately formed into thin sheets while passing into the channels and these sheets circle around the interior of the casing and out of the ends 14 of the channels. From the channels the steam passes into the central chamber 15 and upwardly through the outlet 12. The moisture contained in the steam impinges on the surfaces of the baffles 13 and flows downwardly to the lower ends of the channels and into the liquid chamber 16 and out through any suitable liquid outlet 17. This outlet may be connected to any suitable trap means, whereby the liquid is passed off in a common manner.

In order to assist gravity in forcing the moisture downwards, the inlet 11 is inclined downwardly so as to give the steam and moisture an initial direction downwardly; and the moisture by virtue of its own inertia, the force of gravity and also the force of the steam itself, passes rapidly onwardly along the surfaces of the outer walls of the channels and thus downwardly into the water chamber. By forming the steam into thin sheets the moisture from any portion of the steam mass has but a short distance to travel laterally before reaching a baffle surface, and thus as the steam curves through the passageways particles of moisture therein are repeatedly forced against a baffle surface until none remains in the steam. With separators in which the steam strikes squarely against the surfaces the drops of moisture adhering to the surface are more or less broken up and are forced more firmly against the surface; so that they are retarded in their downward flow by the steam, and portions thereof tend to pass on with the steam. But by my method the steam force tends to move the drops on without disrupting them and thus assists the downward movement of the moisture.

In order to prevent short circuiting of the channels; that is, to prevent the steam in the inner channels from passing outwardly into the adjacent channels; I provide a sheet 18 (Fig. 5) which closes the upper ends of the channels, and a sheet 19 which closes the lower end of the channels. The sheet 18 has an enlarged opening 20 which allows the steam to pass upwardly through the outlet 12 and the sheet 19 has an opening 21 which allows the separated fluids to pass downwardly into the chamber 16. In order to reduce the tendency of the moisture to flow out of the ends 22 of the channels I provide baffles to the flow of water on the ends of the sheets by bending the ends inwardly or by forming thereon the loops 25; and to prevent a tendency of the fluid to be forced onto the sheet 19 I provide a baffle 23 which extends upwardly over the opening 21.

I prefer to form the baffles spirally, as indicated, and to increase the widths of the passageways as the outlets are approached. This provides increasingly greater steam space as the steam flows onwardly through the passageways, and hence the speed of the steam flow is increasingly diminished. This allows the moisture to pass more readily through and out of the steam, and decreases the tendency of the steam to take up moisture from the wet walls.

As a modification a separator such as is illustrated by Figs. 3, 4 and 5 may be used. In this case the ends 24 of the baffles are cut at an inclination, as indicated in Figure 3, so as to shorten the upper surfaces along which the water travels the lesser distance, thus giving greater space for the steam without interfering with the moisture. Also in his instance I form loops 25 on the ends of the walls of the channels, as indicated in Figure 4, so as to prevent any moisture passing off of the ends and thus being taken up with the steam. These loops together with the inclined ends give the moisture passing into the loops a downward impulse which assists gravity in separating the moisture from the steam.

Other apparatus may be used for carrying out the method of separation which I have discovered. It is desirable that the steam be formed in comparatively thin sheets so that the moisture will not have too great a distance to travel in passing from the interior portions of the steam to the adhering surface, and also to have the steam continually impinge against the surface at acute angles.

I claim as my invention:

1. A fluid separator comprising a casing, two substantially concentric spiral sheets mounted in said casing and forming a relatively deep but narrow curved passageway therein, a fluid inlet communicating with the one end of said passageway, and a gas outlet and a liquid outlet communicating with the other end of said passageway, the width of said passageway increasing as the gas outlet is approached.

2. A steam separator comprising a cylindrical casing, a plurality of vertical curved sheets mounted in said casing, forming a plurality of vertical narrow spiral passageways in said casing, the two ends of the sheets being adjacent and on the same side of the casing, means for passing steam into one side of said casing, and into one end of each of said passageways, and means for passing steam out of the other end of each of said passageways.

3. A steam separator comprising a cylindrical casing, a plurality of vertical curved sheets mounted in said casing forming a plurality of vertical, very narrow, spiral passageways in said casing, a steam inlet for passing steam into one side of said casing and into one end of each of said passageways, means for passing steam out of the other end of each of said passageways, the outer end of said steam inlet being higher than the inner end.

4. A steam separator comprising a cylindrical casing, a plurality of vertical curved sheets mounted in said casing forming a plurality of vertical very narrow, curved passageways in said casing, means for passing steam into one end of each of said passageways, means for passing steam out of the other end of said passageways, and a sheet positioned over and closing the upper ends of said passageways, and a steam outlet in the central upper portion of said casing.

5. A steam separator comprising a cylindrical casing, a plurality of vertical curved sheets mounted in said casing forming a plurality of vertical very narrow, curved passageways in said casing, means for passing steam into one end of each of said passageways, means for passing steam and water out of the other end of said passageways, a sheet positioned over and closing the upper ends of said passageways, and another sheet positioned below and closing the lower ends of said passageways.

6. A steam separator comprising a cylindrical casing, a plurality of vertical, very narrow, curved passageways in said casing, means for passing steam into one end of each of said passageways, means for passing steam and water out of the other end of said passageways, a sheet positioned below and closing the lower ends of said passageways, and a baffle fixed to the latter sheet and projecting upwardly in front of the water outlet of said passageway.

7. A steam separator comprising a casing having a steam inlet and an inner steam outlet and having a water outlet in its lower portion, a vertical spiral relatively deep and narrow passageway connecting with said inlet and passing therefrom to said outlets and connecting with said outlets, and an inclined flange extending upwardly into the said steam outlet chamber in front of the said water outlet.

8. A steam separator comprising a cylindrical casing, a plurality of vertical curved sheets mounted in said casing forming a plurality of vertical, very narrow, passageways in said casing, means for passing steam into one end of each of said passageways, means for passing steam and water out of the other end of each of said passageways, the outer ends of the walls of said passageways being shorter at the upper ends of the passageways than at the lower ends of the passageways.

9. A steam separator comprising a cylindrical casing, a plurality of vertical curved sheets mounted in said casing forming a plurality of vertical, very narrow, passageways in said casing, means for passing steam into one end of each of said passageways, means for passing steam and water out of the other end of each of said passageways, the outer ends of the walls of said passageways being shorter at the upper ends of the passageways than at the lower ends of the passageways, and loops fixed to the ends of the walls at the outlet ends of said passageways.

10. A fluid separator comprising a casing having a fluid inlet in its side portion, a liquid outlet at its lower inner portion, and a gas outlet at its upper inner portion, a curved baffle vertically mounted in said casing between said outlets and inlet, the curvature of said baffle increasing as the outlets are approached, the ends of said baffle being adjacent.

11. A steam separator comprising a cylindrical casing, a plurality of vertical curved sheets mounted in said casing forming a plurality of vertical, narrow, passageways in said casing, means for passing steam into one end of each of said passageways, and means for passing the steam and water out of the other end of each of said passageways, the ends of the sheets at the outlet ends of said passageways being bent through angles of substantially 180° to form loops on the ends of the sheets.

12. A steam separator comprising a cylindrical casing, a plurality of vertical spiral sheets mounted in said casing forming a plurality of vertical narrow, spiral passageways in said casing, means for passing steam into one end of each of said passageways, means for passing the steam and water out of the other end of each of said passageways, and loops fixed to the ends of the sheets of the passageways at the outlet ends of said passageways.

In testimony whereof, I hereunto set my hand.

GRANT D. BRADSHAW.